United States Patent [19]

Treyssac et al.

[11] Patent Number: 4,528,098
[45] Date of Patent: Jul. 9, 1985

[54] SCREW DRIVEN SLUDGE THICKENERS

[75] Inventors: Georges M. Treyssac, Marcq En Baroeul; Robert Morawek, Mons En Baroeul, both of France

[73] Assignee: Societe Anonyme D'Etudes, de Recherches et de Productions D'Agents Chimiques - E.R.P.A.C., Paris, France

[21] Appl. No.: 573,880

[22] Filed: Jan. 26, 1984

[30] Foreign Application Priority Data

Feb. 2, 1983 [FR] France .................................. 8301646

[51] Int. Cl.³ ............................................. C02C 3/00
[52] U.S. Cl. .................................... 210/414; 100/117; 100/145; 198/676; 210/415
[58] Field of Search ...................... 210/413, 414, 415; 100/117, 145, 146, 147, 148, 149, 150; 198/670–677

[56] References Cited

U.S. PATENT DOCUMENTS

| 3,550,526 | 12/1970 | Hoover | 100/117 |
| 3,585,924 | 6/1971 | Nolan | 210/415 |
| 3,624,729 | 11/1971 | Hoover | 100/117 |
| 4,380,496 | 3/1983 | Maffet | 100/148 |

FOREIGN PATENT DOCUMENTS

| 1243914 | 7/1967 | Fed. Rep. of Germany | 210/415 |
| 55-51000 | 4/1980 | Japan | 100/117 |

Primary Examiner—John Adee
Attorney, Agent, or Firm—Walter C. Farley

[57] ABSTRACT

An apparatus for removing liquid from a solid suspension includes a screw conveyor in a housing having a suspension inlet, a liquid outlet and a separate outlet for the thickened solids. To increase the thickening effect, the faces of the screw threads are coated or treated to cause the coefficient of friction of the front, thrust faces to be higher than that of the rear faces. The coefficients can also be varied longitudinally, either continuously or in stages.

5 Claims, 1 Drawing Figure

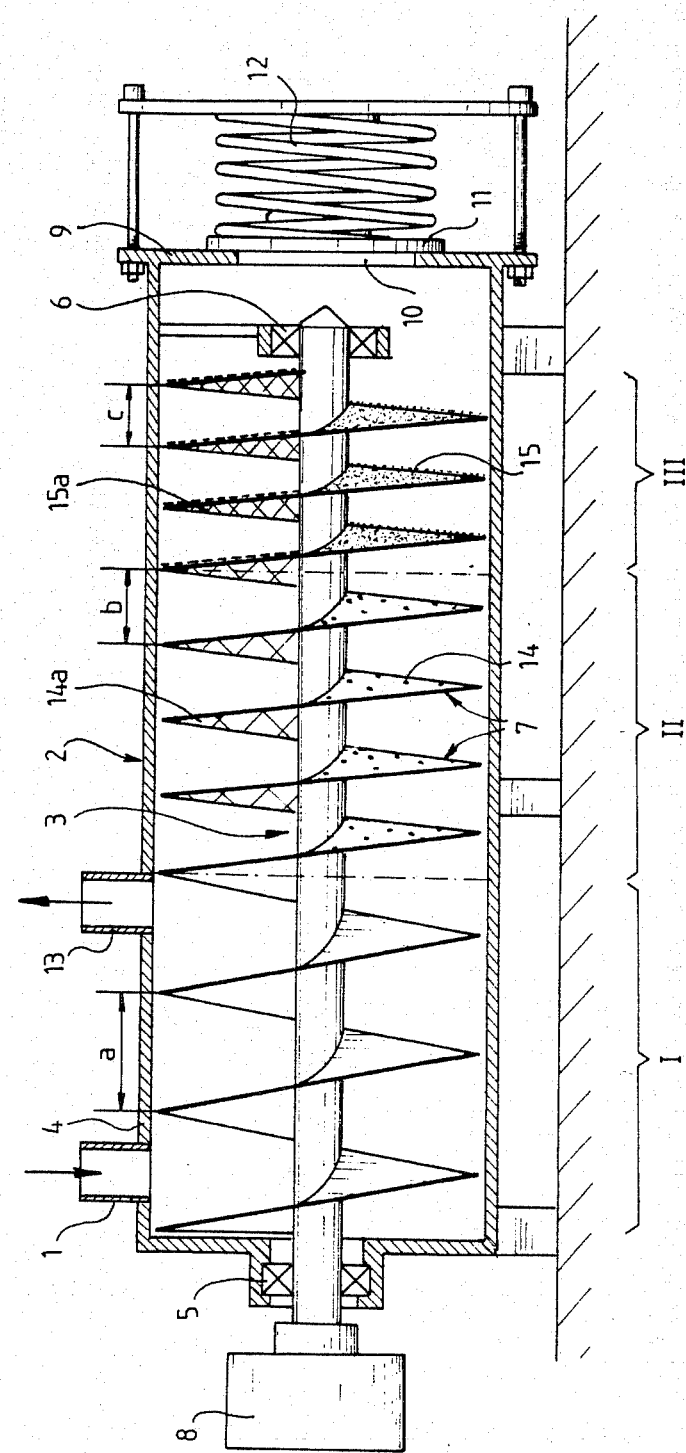

SCREW DRIVEN SLUDGE THICKENERS

The present invention relates to an improved apparatus for thickening a suspension of solid particles in a liquid, such as a sludge which may be flocculated, comprising a rotary endless screw extending longitudinally in a cylindrical enclosure having at least one inlet for the suspension to be thickened, an outlet for the thickened suspension situated in the vicinity of the front end of the screw and at least one outlet for the liquid separated during the thickening.

BACKGROUND OF THE INVENTION

Numerous industries, such for example as the chemical industry, the paper industry or the food industry, throw away large amounts of liquids charged with insoluble mineral or organic materials. For recycling these liquids or disposing of them without polluting the environment, they are in general subjected to previous clarification, this treatment being generally carried out in decanters or flotation apparatus of different designs which provide on the one hand a clarified liquid and on the other hand a suspension of solid particles in the form of sludges which may still contain up to 98% of liquid.

For recycling the solid particles or else for facilitating the handling and/or the transport of the sludges, it is desirable to reduce very substantially the liquid content of these latter, this result being obtained more especially by using the above defined apparatus.

In known apparatus of this type, the screw, because of its rotational movement, causes the suspension to be transferred from the rear end to the front end of the cylinder, i.e. towards the thickened suspension outlet at the level of which it forms, possibly in cooperation with appropriate means, a plug which prevents the liquid separated during the thickening from being discharged through this outlet and brakes to a greater or a lesser degree the discharge of the thickened suspension which is thus compacted to a greater or lesser degree. During this transfer, the suspension is pushed on the thrust face of the threads of the screw, which results in a separation of the liquid and so progressive thickening of the suspension, the separated liquid being discharged to the outlet provided for this purpose. However, in these apparatus, the pressure exerted by the screw on the suspension remains substantially constant during the whole thickening procedure, i.e. during the whole time when the suspension progresses from the rear end to the front end of the cylindrical enclosure. It will therefore be readily understood that, although concentration of the sludges is relatively easy in the rear part of the cylindrical enclosure where the viscosity of said sludges is low, this concentration is more and more difficult to obtain as the viscosity of the sludges increases, that is to say as these latter progress in the enclosure. The result is necessarily a limitation of the degree of thickening of the sludges leaving the apparatus.

SUMMARY OF THE INVENTION

To overcome this disadvantage, the present invention proposes an apparatus of the type defined in the first paragraph of this description and which is characterized in that all or part of the threads of the screw have, at least on their thrust face, a high friction coefficient.

It is in fact apparent, all other things being equal, that limiting the sliding phenomena of the suspension on said thrust surface leads to an increase in the pressure exerted by this face on the suspension.

It will thus be readily understood that, by using such means, particularly in the front part of the cylindrical enclosure where a high viscosity suspension flows, the action of the thrust face of the threads is increased; the result is that the suspension is pushed more strongly against this face, the amount of liquid thus pressed out from the suspension being therefore greater.

Said friction coefficient may be variable and increasing from the rear end to the front end of the screw. In fact, in the rear zone of the enclosure where the suspension is very rich in liquid, this latter is fairly easily separated from this suspension because of the low viscosity thereof. The friction coefficient may therefore in this rear zone be less than the friction coefficient in the front zone of the screw where the suspension has a high viscosity which, because of its nature, is difficult to concentrate.

It will be further noted that the variation of the friction coefficient may occur in successive stages.

It should be noted that if only the thrust face of the threads of the screw has a high friction coefficient, discharge towards the appropriate outlet of the liquid which is separated from the suspension is facilitated by promoting sliding of this liquid over the low friction coefficient face, which further increases the desired thickening. Since this sliding is all the more promoted the lower the friction coefficient on the rear face of the threads, this rear face will advantageously be given the lowest possible friction coefficient.

It was mentioned above that, for reasons of increasing viscosity, the concentration of the suspension becomes more and more difficult as it approaches the front end of the enclosure; therefore, it is advantageous for the liquid which is separated from the suspension under the effect of the pressure exerted by the thrust face of the threads to be discharged more and more readily towards the outlet provided for this purpose the closer it gets to said front end. This result may be obtained if the friction coefficient on the rear face of the threads is variable and decreasing from the rear end to the front end of the screw, this variation being provided advantageously in successive stages which correspond to those by which the friction coefficient of the thrust face of the threads of the screw varies.

BRIEF DESCRIPTION OF THE DRAWING

One embodiment of the invention is illustrated hereafter by way of example, with reference to the accompanying drawing which is a schematic longitudinal section of an endless screw thickener, with a pitch varying in successive stages.

DESCRIPTION OF THE PREFERRED EMBODIMENT

The suspension to be thickened, after a possible previous flocculation treatment using known techniques, is fed through a pipe 1 into the upstream part of a horizontal cylindrical enclosure 2 in which an endless screw 3 extends longitudinally, pipe 1 opening into enclosure 2 through the cylindrical wall 4 thereof. Screw 3 is mounted for rotation in enclosure 2 by means of two bearings 5, 6 with a minimum play between the top of threads 7 of the screw and enclosure 2. Furthermore, this screw 3 is rotated by a motor 8 comprising appropriate means for adjusting the rotational speed of screw 3 to the value, which may easily be determined by tests, such as to obtain the desired thickening under the best conditions. Screw 3 has a variable pitch (a>b>c), this pitch decreasing by successive steps I, II, III from the upstream end to the downstream end of the enclosure, considering the direction of progression of the suspension. It should also be noted that the last thread at the front end of screw 3 is situated at a distance from the downstream lateral face 9 of enclosure 2 such that a plug of thickened suspension may be formed between this latter thread and face 9.

The lateral face 9 is provided with an opening 10 for discharging the thickened suspension, which cooperates with a shutter 11 urged by a spring 12 or any other equivalent means against the edges of opening 10. As for the cylindrical wall 4, it supports, besides pipe 1, a pipe 13 for discharging the liquid separated from the suspension, disposed downstream of said pipe 1.

The suspension to be thickened entering the enclosure through pipe 1 is transferred by the endless screw 3 towards the downstream end of the enclosure, i.e. towards the opening 10. During this transfer, the suspension is pushed onto the thrust face of the threads of the screw, this face thus exerting a pressure on said suspension, this pressure causing the liquid to be pressed out of the suspension.

On the thrust face of each thread 7, there is therefore formed a deposit of suspension less and less rich in liquid the further it moves away from pipe 1, the liquid expelled from the suspension (thickening liquid) coming between this deposit and the rear face of the following thread before moving away towards pipe 13, which, to ensure correct discharge of the expelled liquid, is preferably disposed between two successive threads of the screw 3 and in the vicinity of the rear face of the downstream thread. There thus takes place a progressive thickening of the suspension and, therefore, an increase in the viscosity thereof, which tends to make it more and more difficult to expel the liquid from the suspension. However, this difficulty is overcome by using an endless screw 3 in which all or part of the threads have on their thrust face a high friction coefficient as it will be explained hereafter.

It will be noted here that between pipe 13 and the downstream lateral face 9 of the enclosure, the above mentioned suspension which is less and less rich in liquid and the thickening liquid flow in counter current, respectively along the thrust face of the thread and along the rear face of the threads, whereas, between pipe 1 and pipe 13, this flow takes place in the same direction.

The thickened suspension arriving at opening 10 meets the shutter 11 closed under the effect of the tension of spring 12 and which opposes then to the removal of said suspension. The result is the progressive formation of a plug of thickened suspension. Because of the existence of this plug, there is formed, at the downstream end of enclosure 2, a pressure for compacting the suspension, which increases because of the progressive supply of thickened suspension, which pressure promotes thickening of the suspension and removal, through pipe 13, of the liquid separated during this thickening. When this pressure becomes greater than the tension of spring 12, shutter 11 opens so as to release a certain amount of the thickened suspension forming the plug and closes again as soon as said pressure drops again below the tension of the spring. Furthermore, the presence of said plug prevents the removal of the thickening liquid through opening 10; therefore, as it is separated from the suspension, this thickening liquid is conveyed towards pipe 13. It should however be noted that the above mentioned compacting effect may be obtained, though to a lesser degree, in the absence of shutter 11 and spring 12. In fact, in this case a plug of thickened suspension is formed also between the last front thread of the screw and opening 10, this plug braking the discharge of the thickened suspension through said opening 10 and thus ensuring the desired compacting.

In accordance with the invention, an endless screw may be used in which all or part of the threads have at least on their thrust face a high friction coefficient. It is however even more advantageous to use a screw whose threads have a thrust face with a friction coefficient greater than that of the rear face of these same threads. This is what is shown in the single FIGURE of the drawings where the threads of steps II and III have solely on their thrust face, respectively a coating 14 and a coating 15 for increasing the friction coefficient on this face. According to one characteristic of the invention, coating 15 has advantageously a friction coefficient greater than that of coating 14. The coatings in question may be easily chosen depending on the nature of the solid particles and on the desired friction coefficient and they may be formed for example by a layer of neoprene paint or by a fine rubber layer. It will however be noted that another way of increasing the friction coefficient of said thrust faces would consist in subjecting the thread to a physical treatment such as sand blasting so as to modify the surface condition of their thrust face, this treatment being of course carried out so as to confer on the thrust face of the threads of stage III a friction coefficient greater than that conferred on the thrust face of the threads of stage II.

Of course, the desired effect may be further increased by subjecting the rear face of the threads in question to a treatment for lowering the friction coefficient thereof. Thus, and according to another characteristic of the invention, on the rear face of the threads corresponding to stages II and III are respectively deposited a coating 14a and a coating 15a for lowering the friction coefficient on this face, coating 15a having advantageously a friction coefficient less than that of coating 14a. Hereagain, the coatings in question may be easily determined as a function of the desired friction coefficient and will be generally formed by any material capable of forming a coating with a smooth surface such as glass or certain varnishes for example. Moreover, and as before, another way of lowering the friction coefficient of the rear faces of the threads would consist in modifying the surface condition of this face (polishing for example).

The thickening procedure which began at the level of stage I is continued in the zone of enclosure 2 corresponding to stages II and III, this procedure being however accentuated by increasing the friction coefficient of the thrust face of the threads of said stages II and III. In fact, at the level of stage II, the pressure exerted on the suspension by the thrust face of the threads corresponding to this stage is increased, which makes the thickening operation easy, this increase of pressure being even more pronounced in stage III; the thickening liquid separated is moreover more easily discharged towards pipe 13, because of the smooth rear faces over which this liquid may readily slide.

It is of course possible to make different modifications to the thickener which has just been described without for all that departing from the scope or spirit of the invention.

Thus, it is possible to provide several pipes 13 spaced apart over the cylindrical wall 4; pipe 13 could be replaced by an opening formed in the cylindrical wall 4 and extending over a greater or smaller length of enclosure 2; the cylindrical wall 4 could be formed over a part at least of its length by a filtering grid through which the thickening liquid is discharged, this grid playing the same role as pipe 13 and being able therefore to replace this latter; the pitch of screw 3 instead of decreasing by successive stages, could decrease continuously from the upstream end to the downstream end of the enclosure 2; the threads corresponding to stage I could also comprise, on their thrust face, a coating of a kind such as to increase the friction coefficient and, on their rear face, a coating of a kind such as to lower the friction coefficient, so that on said thrust face the friction coefficient increases from the rear end to the front end of the screw and on said rear face the friction coefficient decreases from the rear end to the front end of the screw; finally, instead of varying the friction coefficients by successive stages, they could be varied continuously.

We claim:

1. An apparatus for thickening a suspension of solid particles in a liquid such as a sludge comprising a cylindrical enclosure;

a rotary endless screw extending longitudinally in said enclosure, said enclosure having an inlet for suspension to be thickened, a first outlet for thickened suspension near the front end of said screw and a second outlet for liquid separated during the thickening; and means on said screw for causing a higher coefficient of friction on the front, thrust faces of the threads of said screw than on the rear faces thereof.

2. Apparatus according to claim 1 wherein said friction coefficient on said thrust faces varies along the length of said screw and increases from the rear end to the front end of said screw.

3. Apparatus according to claim 2, wherein said friction coefficient varies in successive stages.

4. Apparatus according to claim 3, wherein the friction coefficient of the rear faces of the threads varies along the length of said screw and decreases from the rear end to the front end of said screw.

5. Apparatus according to claim 4, wherein said friction coefficient of the rear faces of the threads varies in successive stages corresponding to the variation of the friction coefficient of the thrust faces of the threads.

* * * * *